United States Patent
Eicher

(10) Patent No.: US 6,279,858 B1
(45) Date of Patent: Aug. 28, 2001

(54) WOVEN WIRE NETTING FOR PROTECTION AGAINST ROCK FALLS OR FOR SECURING A TOP LAYER OF SOIL, AND METHOD AND DEVICE FOR PRODUCING SAME

(75) Inventor: Bernhard Eicher, Winden (CH)

(73) Assignee: Fatzer AG, Romanshorn (CH)

( * ) Notice: Subject to any disclaimer, the term of this patent is extended or adjusted under 35 U.S.C. 154(b) by 0 days.

(21) Appl. No.: 09/403,586
(22) PCT Filed: Feb. 2, 1999
(86) PCT No.: PCT/CH99/00044
§ 371 Date: Oct. 25, 1999
§ 102(e) Date: Oct. 25, 1999
(87) PCT Pub. No.: WO99/43894
PCT Pub. Date: Sep. 2, 1999

(30) Foreign Application Priority Data

Feb. 25, 1998 (CH) .................................................. 0465/98

(51) Int. Cl.[7] .................................................. B21F 27/00
(52) U.S. Cl. ................................. 245/8; 245/1; 256/12.5; 256/13; 256/32; 256/33; 256/34; 256/45; 256/46; 256/47
(58) Field of Search ................................. 140/3 R; 245/5, 245/6, 8, 10; 256/12.5, 26, 33, 34, 45, 13, 32, 46, 47; 428/131, 222, 595

(56) References Cited

U.S. PATENT DOCUMENTS

| | | | | |
|---|---|---|---|---|
| 3,812,741 | * | 5/1974 | Heine | 81/3.4 |
| 4,072,295 | * | 2/1978 | Roberts | 256/26 |
| 4,124,183 | * | 11/1978 | Herrig et al. | 245/6 |
| 4,188,020 | * | 2/1980 | Herrig et al. | 256/45 |
| 4,860,997 | * | 8/1989 | Schoenheit et al. | 256/34 |
| 5,996,972 | * | 12/1999 | Kaiser | 256/12.5 |

FOREIGN PATENT DOCUMENTS

491195 * 6/1992 (EP) .

* cited by examiner

Primary Examiner—John J. Calvert
Assistant Examiner—Shaun R Hurley
(74) Attorney, Agent, or Firm—Wenderoth, Lind & Ponack, L.L.P.

(57) ABSTRACT

A wire netting, preferably used as a gravel screen or for protecting a soil surface layer is woven from corrosion-resistant wires and either fitted on the soil surface or secured in an almost upright position on a slope or something similar. The wires in the wire netting are manufactured from heavy-duty steel, which has a nominal strength in the region of 1000 to 2200 N/mm2 and steel wire may be used for this for stranded wires or spring steel wire. The wire netting is manufactured from rectangular, diagonal netting and it has a three-dimensional, mattress-like structure.

11 Claims, 4 Drawing Sheets

Stand der Technik

WOVEN WIRE NETTING FOR PROTECTION AGAINST ROCK FALLS OR FOR SECURING A TOP LAYER OF SOIL, AND METHOD AND DEVICE FOR PRODUCING SAME

The invention concerns wire netting for a gravel screen or for protecting a soil surface layer which is woven from corrosion-resistant wires and is either placed on the surface of the soil or is secured in an almost upright position on a slope or something similar.

Figure 8:
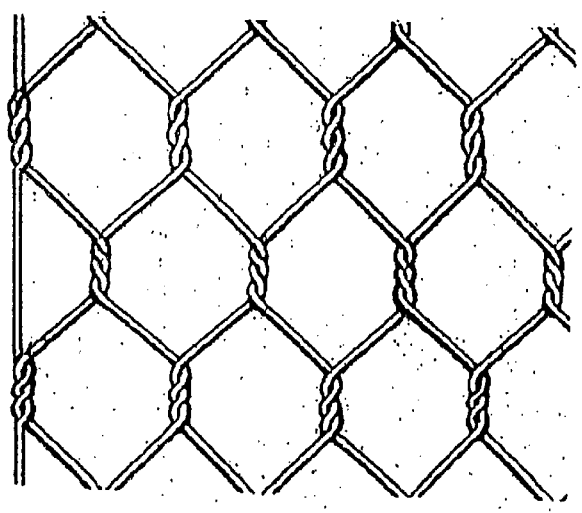

In the case of a known wire netting which is very frequently used, the same is formed from a hexagonal wire netting as is shown in the enclosed drawing (FIG. 8). Such wire netting consists of galvanized steel wires with low bending- and tensile strength values so that the latter may be stranded during weaving. The hexagonal shape of the individual meshes results following the repeated stranding of two wires which are woven together, whereby these stranded points run in the longitudinal direction of the netting and the individual wires in between run diagonally. In the shape in which they are manufactured and used, these wire nettings form an almost two-dimensional shape, ie. when regarded as a cross-section, this wire mesh is almost linearly formed since, due to their low resistance, these wires may be bent into any shape using less power consumption. These wire nettings are rolled up for storage and transportation and they require a lot of space for this. When unrolling these meshes at the assembly site at the same time, a further drawback of the latter is the fact that due to having been rolled up, these meshes very rapidly open and spread out by themselves.

When using such wire nettings as embankment protection components on steep, unstable embankments, the latter must be reinforced with stranded wires which are strained at regular intervals in a diagonal, longitudinal and/or cross direction above the wire netting or are woven into the latter. In addition, they should be provided with edge reinforcements and revetments anchored in the soil should be provided at regular intervals of one to five meters above the whole area so that the wire nettings ensure adequate surface-covering support for the surface layer which is at risk of sliding or having the surface area become detached. However, wire nettings are exposed to an increased risk of breakage at the stranded points.

On the other hand, the present invention has been based on the problem of creating a wire netting according to the type mentioned at the beginning which is formed in such a way that with this, as opposed to the known wire nettings, a cheaper and lighter weight covering is obtained for easier assembly on an embankment or gravel buttress. In addition, using this wire netting as embankment protection, improved conditions should be created for consolidating layers of vegetation or for holding in place humus or sprayed on layers on the covered soil, consolidating layers of vegetation or restraining humus or sprayed on layers on the soil which is covered. Furthermore, this wire netting should be able to be folded up in order to save space during its storage and transportation.

According to the invention, the problem is solved by the fact that the wires in the wire netting are manufactured from heavy-duty steel whereby this steel wire, as opposed to the known wire nettings, should preferably have an up to three times higher tensile strength which is within the region of 1000 to 2200 N/mm2.

In comparison to a known wire netting, by using this wire netting according to the invention with an assumed nominal strength, for a specific area of cover, more than half of the weight may be reduced, whereby substantial cost savings should result with the regard to the material required as well as the removal and assembly of such netting. Furthermore, due to the high bending strength of the wires, in case of a possible breakage occurring in the wire, the risk of a ladder arising may be reduced.

Due to its increased bending strength even in a stretched state, a three-dimensional or mattress-shaped structure is obtained when using this wire netting according to the invention. As a result, this netting may be used when covering earth, for example, an embankment and in addition, to hold in place or stabilize layers of vegetation or sprayed on coverings.

A further advantage of this wire netting consists of the fact that this netting, which consists of interwoven, single, spiral-shaped, bent wires, may be folded up and accordingly, it takes up less space during storage and transportation.

Figures 1, 2:
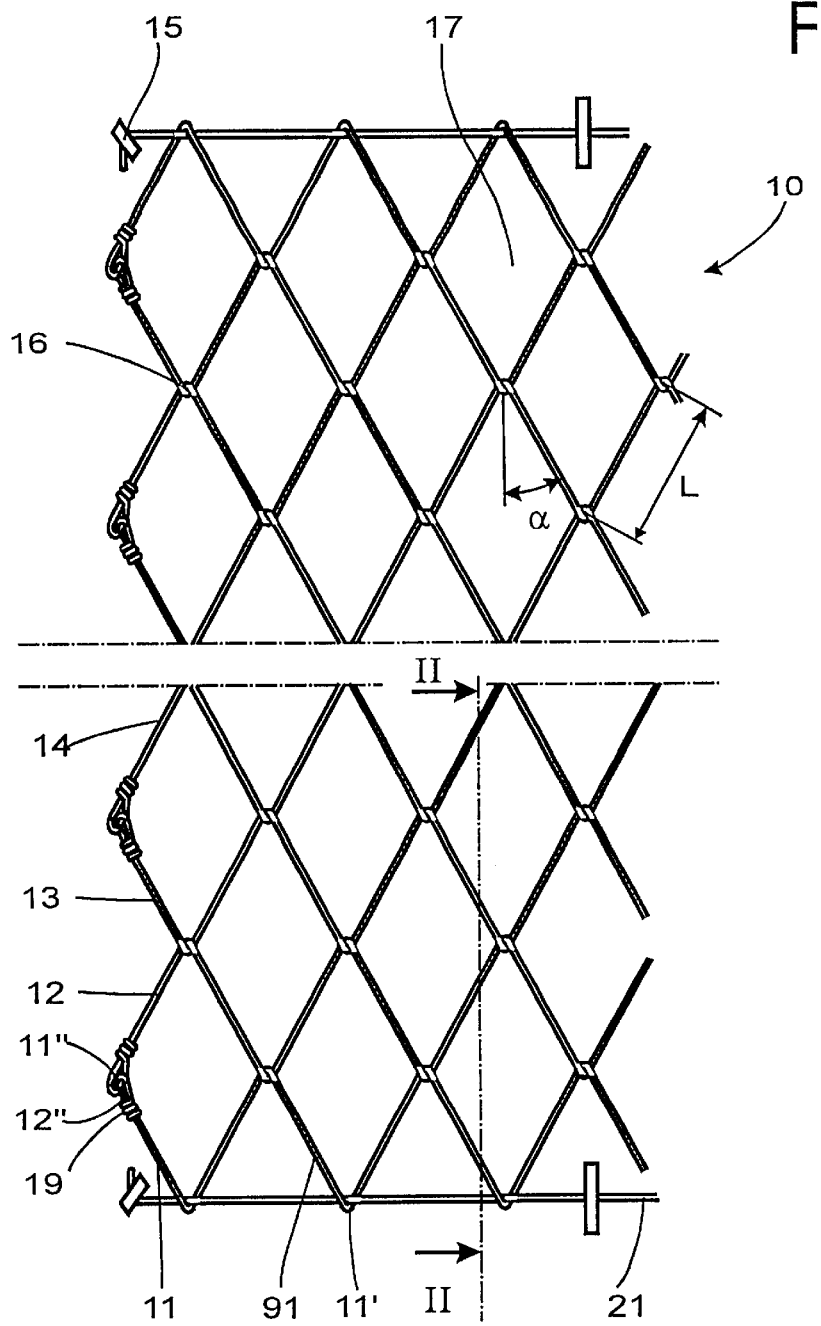
Figure 3:
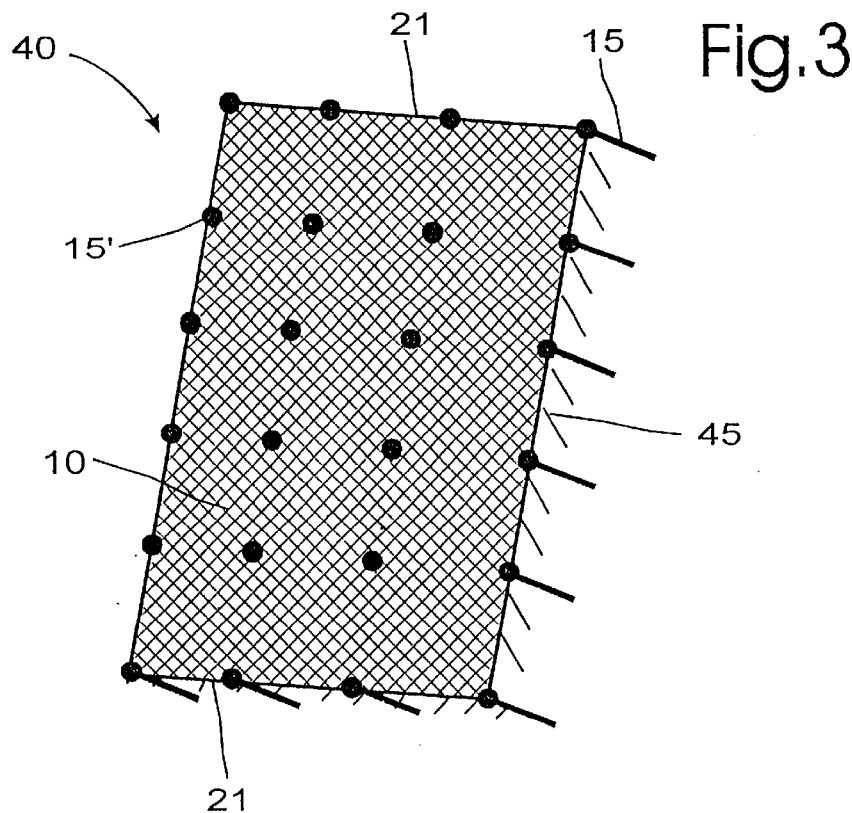
Figure 4:
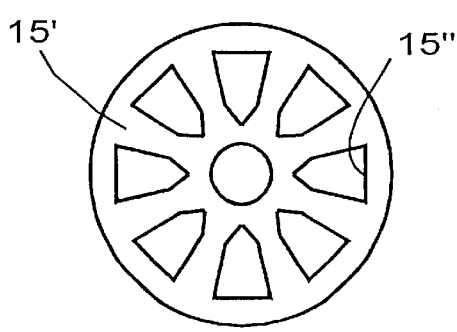
Figure 5:
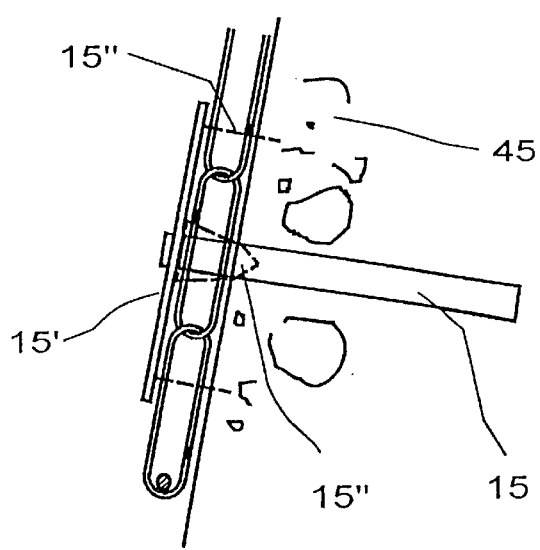
Figure 6:
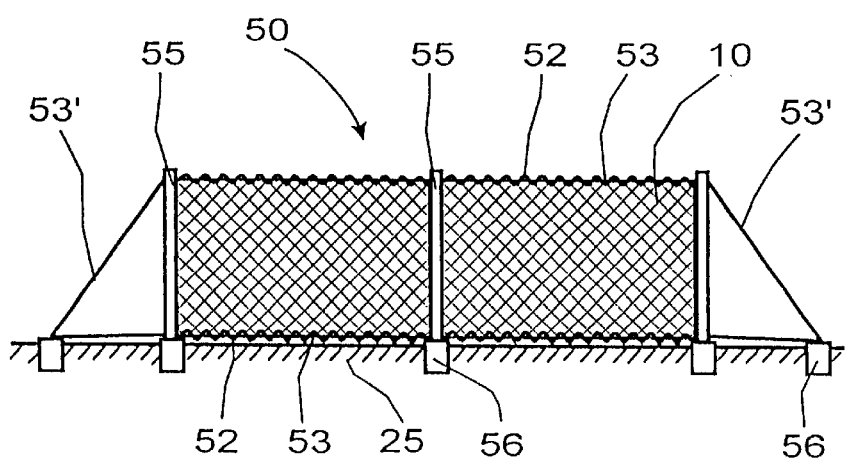
Figure 7:
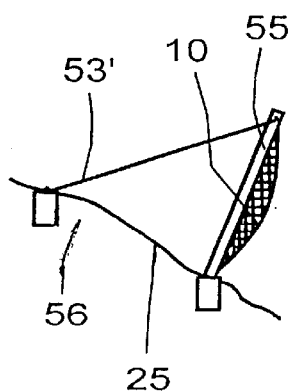
Figures 9, 10, 11:
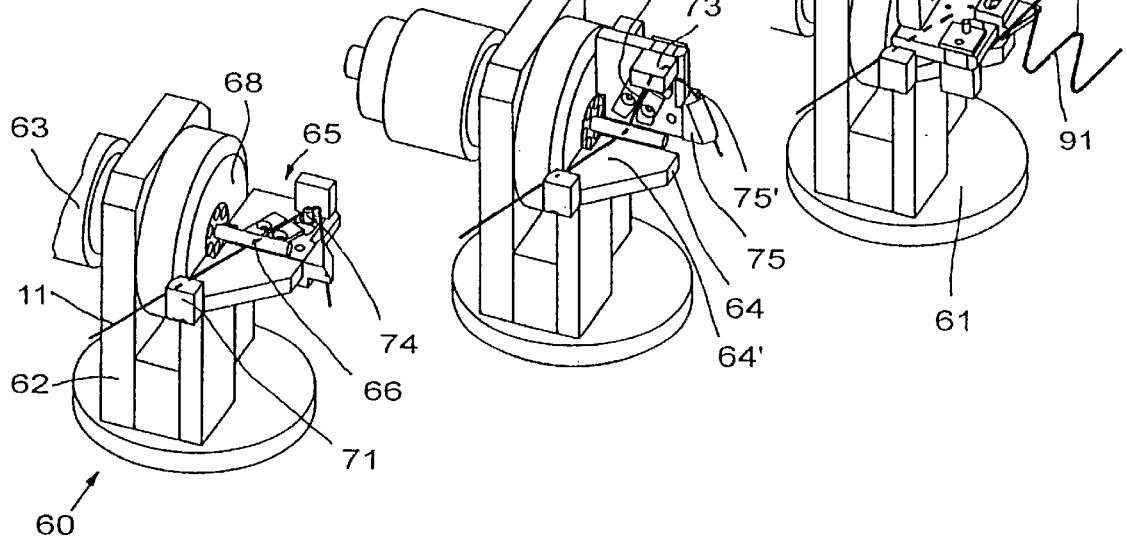

Various embodiments of the invention as well as other advantages of the same are explained in more detail below by way of a drawing. It shows:

FIG. 1 a top view of the wire netting according to the invention,

FIG. 2 a cross-section of the wire netting along the line II—II according to FIG. 1, FIG. 3 a perspective diagram of the wire netting according to the invention as embankment protection, FIG. 4 a view of an embankment protection gripping plate according to FIG. 3, FIG. 5 a partial cross section of the embankment protection according to FIG. 3, FIG. 6 a diagram of a top view of wire netting with a gravel screen buttress, FIG. 7 a diagram of a side view of the gravel screen buttress according to FIG. 6, FIG. 8 a diagram of a partial view of a known wire netting with stranded wires, FIG. 9 to FIG. 11 a perspective diagram of a device used to manufacture the wire netting in various operating positions, and FIG. 9a to FIG. 11a in each case a diagram of a front view of the device in its operating positions according to FIG. 9 to FIG. 11.

FIG. 1 shows wire netting 10 for protecting the surface layer of soil like, for example, embankment protection or for protecting a stone wall in a street or something similar. In this case, this wire netting 10 is composed of woven wires 11, 12, 13, 14 and held in place by a defined bracing by revetments 15 which are sunken into the soil. These wires are usually galvanised, provided with a zinc/aluminium coating and/or a plastic coating or are made from a chrome alloy in order to achieve the required corrosion resistance. In addition to this, for example, a galvanised coating is provided with a surface weight of between 100 and 250 g/m2.

According to the invention, the wires 11, 12, 13 and 14 in the wire netting 10 are manufactured from heavy-duty steel. Preferably, wires are used for these heavy-duty steel wires 11, 12, 13 and 14 which are twisted into stranded wires. According to the DIN standard 2078, wires such as these have a nominal strength of between 1000 and 2200 N/mm2, for example, wires which are 1770 N/mm2. However, spring steel wires could also be used according to the DIN standard 17223. The wire thickness is preferably between one and five millimeters. This depends upon the tensile strength required.

The wire netting 10 is formed from rectangular, diagonal netting in which the individual, spiral-shaped, bent wires 11, 12, 13, 14 have an angle of inclination a as well as a length L between two bends which determine the shape and size of the meshes 17 in the wire netting 10. Preferably an angle of approximately 30° is selected as the angle of inclination α. The individual meshes 17 respectively form a rhomboid, whereby the width of the meshes amounts to 77×143 mm, for example. This offers the advantage that the netting 10 is not stretched considerably if it is laid on a soil surface and is harnessed by the cables 21 in its longitudinal extent upon being pulled. In addition, as a result of this, the individual meshes 17 form a rhomboid with an elongated opening which provides the advantage of less Penetrability of the soil material.

At the side ends, the wires 11, 12, 13, 14 are flexibly bound with each other in pairs by 11", 12" loops, whereby these 11", 12" loops are formed by the wires themselves being bent over at the side ends. After they have been bent into loops, in addition, the wires are preferably provided with several loops 19 which are wound around their own circumference which, due to the tensile load on these loops in the condition in which they are used, ensures adequate security to prevent them from opening.

Within the framework of the invention, this results in the further advantage that the individual wires are flexibly held together with one another in an interwoven state, the consequence of which is that this wire netting 10 may be folded up or rolled up like a mat. Consequently, less space is needed to store and transport such meshes.

Preferably, a wire or cable 21 is looped on to the edge wire 11 which is at the upper and lower end of the mesh 10 which in turn is stretched on to the soil by the revetments 15 or such like However, in principle, the revetments 15 could also actually hold the 11' wire loops on.

According to FIG. 2, the mesh 10 has a three-dimensional, mattress-like structure which is again made possible by the use of heavy-duty steel wire. The individual wires 11, 12, 13,14 are bent into a spiral shape for this purpose and then interwoven with one another in such a way that the bent wires and the mesh 10 arising from this, when regarded as a cross-section, form an almost rectangular shape. The wires therefore consist of bent parts 11' and straight parts 91. This elongated rectangle has a thickness of several wire thicknesses. As a result of this, this wire netting 10 is also formed in a harnessed state, not almost line- or band-shaped like the known wire netting according to FIG. 8, but three-dimensionally. On one hand, this causes the netting to have an increased elastic property since these wires may be stretched with increasing bracing in their longitudinal extent and give this wire netting increased elasticity. On the other hand, in addition, the support or stabilization of the layers of vegetation placed into this netting or of sprayed on coverings is obtained by this three-dimensional formation when covering soil, for example, an embankment.

Apart from the width of the mesh, the thickness 10' of the netting 10 may be varied according to its usage. This thickness 10' is defined when bending each individual wire 11, 12, 13, 14. It amounts to a multiple which is preferably between 3 to 10 times the thickness of the wire, as illustrated in FIG. 2.

As opposed to the known hexagonal netting, as shown in FIG. 8, with this wire netting, due to the almost straight-lined magnetic flux arising in a diagonal direction, this results in an optimum flow of energy and due to this, the improved bracing of the soil covered. Local magnetic influences upon the wire netting at the diagonals are transferred to the sides and at the same time, are absorbed by various revetments.

FIG. 3 shows a wire netting 10 according to the invention as embankment protection 40, for example, an embankment which is on a steep slope 45 which forms the soil surface layer which is to be protected This embankment protection 40 consists of wire netting 10 which is placed over the desired embankment area and of revetments 15 which are sunken into the soil with gripping plates 15' or such like which press the netting 10 on to the surface of the soil. Soil- or rock spikes which are known are needed for the revetments 15 and are preferably secured at regular intervals on the embankment 45. On the upper and lower end of the netting 10, a cable 21 is respectively provided, by means of which the netting 10 is stretched by traction.

FIG. 4 and FIG. 5 show the gripping plate 15' which, as illustrated, consists of round, oval or alternatively shaped sheeting and from various grips 15' that are bent at right angles projecting downwards and are made of this sheeting which are respectively formed in a wedge shape. Each gripping plate concerned 15' is pressed by the revetment 15 on to the wire netting 10 and it causes the embankment 45 to be permanently protected due to the wire netting 10, which has an effect upon the whole supporting area. Due to their wedge shape, the grips 15" which extend through the netting cause wedging with the wire netting.

In the case of soft soil conditions, in order to apply harnessing which is as highly defined as possible to the revetments, a textile pad may be placed underneath the gripping plate 15' and under the netting with a surface area of up to more than one square meter, whereby this weather-resistant textile pad is filled with a pressure-injected mortar composition or such like. In the case of rocky, deeply fissured sub-soil, even in those places in which hollow spaces exist between the embankment surface and the netting, in order to establish contact, textile pads such as these may also be placed underneath.

This embodiment illustrates that on one hand, easier assembly and on the other, due to the mattress-like structure of the netting 10, improved covering results. Such embankments 45 are frequently Formed by steep slopes and are therefore very poorly accessible. The meshes even have to be brought using helicopters. If this netting, as opposed to those which are known, is now less than half the weight, it may be transported and moved with accordingly less expenditure.

This embankment protection 40 may be used for various purposes like, for example, according to the diagram in order to prevent the erosion of the soil surface layer 45, but also for gravel, for the breaking off of stones and blocks or anything similar, for the sliding of the soil surface layer or to support the root layer of the vegetation which occurs on these embankments.

FIG. 6 and FIG. 7 show a wire netting 10 according to the invention for using a gravel fence 50 which is suitable for catching rocks, chunks of rock, tree trunks or any other objects which as a rule slide at great speed with their point facing forwards down into the valley. This wire netting 10 is installed in an almost upright position almost at right angles to a mountain slope 25 and in the process, it is secured to supporting posts 55 made of steel which are respectively anchored in the soil 56. The wire netting 10 is secured via wire cables 52 above and below on horizontal bracing wires 53, whereby this netting is threaded by the wire cables 52 with the respective bracing wire. On one hand, the bracing wires 53 are held on the supporting posts 55 and on the other, secured and tightened using their bracing ends 53' to one base each or such like.

Due to the elastic, springy properties of heavy-duty wire netting 10, high kinetic energies, which are obtained in the case of the impact of stones or tree trunks, may be weakened. The local magnetic influence of the impacting stone or such like is evenly distributed in all directions. In this connection, a further advantage of the wire netting according to the invention arises since the same, in contrast to known wire nettings with low stress factors which are within an elastic range that is many times higher, is able to absorb significantly greater forces, as a result of which, apart from lower manufacturing and installation costs, significantly less repair work is needed.

FIG. 8 shows a tried and tested known woven wire netting which has been explained in the introduction and therefore will not be described in detail below.

FIG. 9 to FIG. 11 show a device 60, by means of which the process for manufacturing the wire netting 10, made of single heavy-duty steel wires 11 according to the invention, is carried out. This device 60 essentially consists of a base 61 with an upright 62, a pivot drive 63, a bending unit 65 which is connected with the latter by means of a rotary action, a guide plate 64 as well as a bending mandrel 66. The pivot drive 63 is secured to the upright 62 and it drives a lathe chuck 68 which supports the bending unit 65, whereby the latter with its horizontal swivel axis is concentrically aligned with the cylindrically shaped bending mandrel 66. The guide plate 64 has a horizontal guide area 64', which is adjusted to a clearance below the bending mandrel 66 which is also horizontal. The swivel carriage 73 of the bending unit 65 is adjusted in the extension to this guide area 64', which is secured at the lathe chuck 68 of the pivot drive 63. In addition, a guide groove 72, a stop 73, a pivot 74 which is regulated in front of the latter as well as a holding joint 75 which has a clearance 75' are attached to this bending unit 65 which are all held together on the swivel carriage 73.

Figures 9A, 10A, 11A:
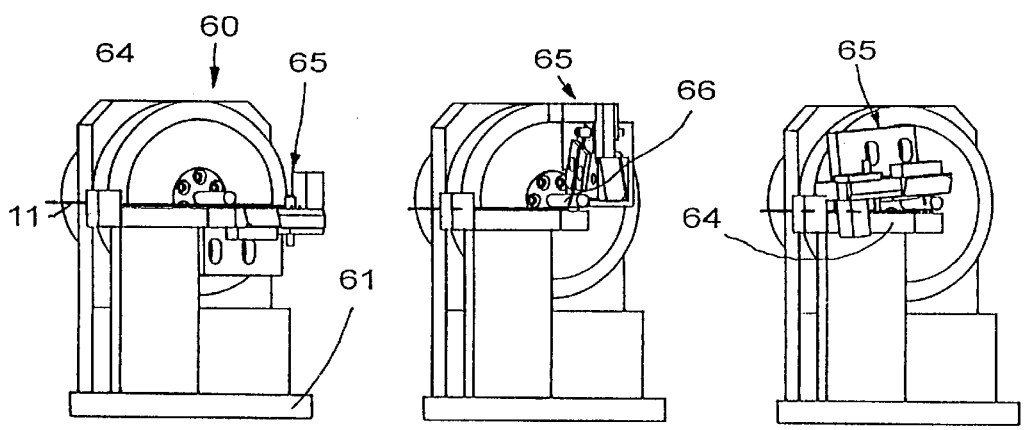

According to FIG. 9 or FIG. 9a, the existing wire which is made of heavy-duty steel 11 is laterally guided through between the lathe chuck 68 and a supporting element 71 on to the guide area 64 and under the bending mandrel 66. Then, it is pushed by the guide groove 72 up to the stop 73. This may be effected mechanically by means of a feeding device which is not shown in more detail. The wire 11 is aligned with the bending mandrel 66 through this guide groove 72, with the angle of inclination α and, from the bending mandrel 66 to the stop, it is of the length L. This angle of inclination α as well as the length L which may be adjusted, where necessary, determine the shape and size of the meshes 17 in the wire netting 10 as already mentioned above. The pivot 74 is additionally used as a guide if the wire 11 has already been bent, whereby in addition, when leaving this pivot 74, the latter is guided by the holding joint 75.

According to FIG. 10 and FIG. 10a, the bending unit 65 is rotated by the controlled drive 63 around the bending mandrel 66, whereby it is shown in an almost vertical position.

As soon as the bending unit 65 is rotated by 180° and according to FIG. 11 or FIG. 11a, lies almost parallel above the guide area 64, the wire 11 which is centered by it is also bent around the bending mandrel 66 by approximately 180°. As a result, this bending unit 65 is again able to be rotated back into the original position shown FIG. 9 in which the wire 11 remains in a bent position. After the bending unit 65 has been rotated back, the wire 11 which has been guided around the bending mandrel 66 is pushed forwards again on its longitudinal axis again up to the stop 73 and centered at the pivot 75 or at the holding joint 75. Afterwards, the next swivel motion is made in a corresponding manner. Following the repeated swivelling to and fro of the bending unit 65 by 180° and the subsequent pushing of the wire, the clearly spiral-shaped wire with bent parts 11' and straight parts 91 is produced according FIG. 11. Due to this process, a further advantage results—a steady increase in the angle α both on the bent part 11 as well as on the straight part of the spiral-shaped bent wire 11.

After such spiral-shaped wires 11 have been bent by the device 60, the latter may be woven together into the wire netting 10 in a conventional manner. For this purpose, the bent wires are threaded into one another until the wire netting of the desired size is produced.

The invention is adequately demonstrated by the aforementioned embodiments. Of course, this wire netting could even be designed differently. Thus for example, the individual wires could be bent differently to those shown. The angle of inclination α in the embodiment explained is approx. 30°, however, where necessary, between 15° and 45° may be allowed for.

The invention is suitable for all types of coverings of soil surface layers, for example, even for those in underground mining. Thus in the above-illustrated way, walls and arches in tunnels, hangars, caverns or similar places may be covered and accordingly secured using these wire nettings according to the invention. In the case of tunnel coverings which are cheaply constructed, any loosened, quarried out rock from these walls may be safely collected using this wire netting covering.

The wire netting 10 may be used in the manner described to reinforce or strengthen layers of foundations in highway construction or road building or in the case of building sites by these meshes being fitted in the corresponding substructure or superstructure. Furthermore, it may be used to reinforce tar- or concrete surfaces like, for example, biluminously or hydraulically cemented surfaces.

What is claimed is:

1. Wire netting for use as a gravel screen or for use in protecting a soil surface layer said wire netting being woven from corrosion-resistant wires and to be either fitted on the soil surface or secured in an almost upright position on a slope, wherein said wires in said wire netting are manufactured from heavy-duty steel.

2. Wire netting according to claim 1, wherein said heavy-duty steel wire has a nominal strength in the region of 1000 to 2200 N/mm2 and is comprised of stranded steel wires or spring steel wire.

3. Wire netting according to claim 1, wherein said wire netting is woven from single, spiral-shaped bent wires whereby the wires are respectively provided with an angle of inclination of preferably between 25° and 35°.

4. Wire netting according to claim 1, wherein said wire netting forms a rectangular, diagonal netting with rhomboid-shaped meshes and a three-dimensional, mattress-like structure.

5. Wire netting according to claim 4, wherein said three-dimensionally shaped wire netting has a thickness which is many times the wire thickness.

6. Wire netting according to claim 1, wherein said wires are flexibly linked in pairs to each other at their ends by loops.

7. Wire netting according to claim 6, wherein, after being bent over into loops, the wires are in addition preferably provided with several loops which are wound around their own circumference.

8. Wire netting according to claim 1, wherein said wire netting, while being used for embankment protection, is held on by several revetments, whereby the latter have gripping plates which press the netting on to the embankment, which consist of round, oval or alternatively shaped sheeting and of several wedge-shaped grips at a right angle and projecting downwards.

9. Process for manufacturing wire netting according to claim 1 in which the wire netting consists of single, spiral-shaped bent wires, wherein the wire, which comprises heavy-duty steel, is fed at a defined angle of inclination of at least a into a bending mandrel and is bent with a defined length L around the bending mandrel by approximately 180° so that the wire is repeatedly pushed on its longitudinal axis up to the bending mandrel at the defined length L and is in each case bent around the bending mandrel by 180° until the wire becomes spiral-shaped.

10. A process according to claim 9 wherein a wedge-shaped, bent wire is interwoven with a second, wedge-shaped, bent wire, and the second wedge-shaped bent wire is interwoven with a third wedge-shaped bent wire and the interweaving is repeated until wire netting is produced which is of the desired size.

11. A device for carrying out the process according to claim 9 comprising:

a guide area;

a bending mandrel which projects up to said guide area;

a bending unit rotatable by a pivot drive, said bending unit having a swivel axis concentrically aligned with said bending mandrel and when swivelling, is operable to center the wire and bend the wire at the angle of inclination $\alpha$ around said rotating mandrel by approximately 180°; and a feeding device operable to push the wire around the length L along its longitudinal axis in said guide area.

* * * * *